US009923785B1

(12) United States Patent
Li et al.

(10) Patent No.: US 9,923,785 B1
(45) Date of Patent: Mar. 20, 2018

(54) RESOURCE SCALING IN COMPUTING INFRASTRUCTURE

(71) Applicant: EMC Corporation, Hopkinton, MA (US)

(72) Inventors: Sanping Li, Beijing (CN); Yu Cao, Beijing (CN); Shamail Tahir, North Grafton, MA (US); Kenneth Durazzo, San Ramon, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 129 days.

(21) Appl. No.: 14/748,503

(22) Filed: Jun. 24, 2015

(51) Int. Cl.
*G06F 15/173* (2006.01)
*H04L 12/24* (2006.01)

(52) U.S. Cl.
CPC ...... *H04L 41/5025* (2013.01); *H04L 41/5054* (2013.01)

(58) Field of Classification Search
CPC . H04L 41/5054; H04L 41/5025; G06Q 10/06; G06Q 30/0202; G06F 9/5072
USPC ....... 709/226; 705/7.13, 7.31, 7.35; 718/104
See application file for complete search history.

(56) References Cited

U.S. PATENT DOCUMENTS

| 8,839,243 B2 * | 9/2014 | Baset | G06F 9/45533 718/1 |
| 2008/0072232 A1 * | 3/2008 | O'Toole, Jr. | G06F 9/505 718/104 |
| 2011/0191781 A1 * | 8/2011 | Karanam | G06F 9/50 718/104 |
| 2011/0238460 A1 * | 9/2011 | Al-Dawsari | G06Q 10/06 705/7.31 |
| 2012/0016721 A1 * | 1/2012 | Weinman | G06Q 10/06 705/7.35 |
| 2013/0085791 A1 * | 4/2013 | Flockhart | G06Q 10/06 705/7.13 |
| 2016/0043906 A1 * | 2/2016 | Mithani | G06F 3/0482 715/736 |
| 2016/0055038 A1 * | 2/2016 | Ghosh | G06F 9/45558 718/105 |

OTHER PUBLICATIONS

Z, Shen et al, "CloudScale: Elastic Resource Scaling for Multi-Tenant Cloud Systems," SOCC'11, Oct. 27-28, 2011, 14 pages, Portugal.

(Continued)

*Primary Examiner* — Thuong Nguyen
(74) *Attorney, Agent, or Firm* — Ryan, Mason & Lewis, LLP (57) ABSTRACT

A current workload associated with a computing infrastructure is monitored for a change in the current workload. A first cost value is computed wherein the first cost value indicates a cost associated with scaling a current resource configuration for the computing infrastructure to respond to the change to the current workload. A second cost value is computed wherein the second cost value indicates a cost associated with ignoring the change to the current workload and maintaining the current resource configuration for the computing infrastructure. The first cost value and the second cost value are compared. A determination is made whether to scale or maintain the current resource configuration based on the comparison of the first cost value and the second cost value.

19 Claims, 4 Drawing Sheets

(56) References Cited

OTHER PUBLICATIONS

Z. Gong et al., "Press: Predictive Elastic ReSource Scaling for Cloud Systems," Proc. 6th IEEE/IFIP International Conference on Network and Service Management, CNSM 2010, Oct. 2010, 8 pages, Canada.
A. Gandhi et al., "Modeling the Impact of Workload on Cloud Resource Scaling," SBAC-PAD'14, Proceedings of the 2014 IEEE 26th International Symposium on Computer Architecture and High Performance Computing, 2014, pp. 1-8.
R. Han et al., "Lightweight Resource Scaling for Cloud Applications," CCGRID 2012 Proceedings of the 2012 12th IEEE/ACM International Symposium on Cluster, Cloud and Grid Computing, 9 pages.
P. Mell et al., "The NIST Definition of Cloud Computing," U.S. Department of Commerce, Computer Security Division, National Institute of Standards and Technology, Special Publication 800-145, Sep. 2011, 7 pages.

\* cited by examiner

A. NO WORKLOAD CHANGES
B. SUSTAINED WORKLOAD CHANGE
C. WORKLOAD CHANGE SPIKE WITH IGNORING COST > SCALING COST
D. WORKLOAD CHANGE SPIKE WITH SCALING COST > IGNORING COST

| PARAMETERS | DESCRIPTION |
| --- | --- |
| $t_C$ | SCALING TIME OF RESOURCE CONFIGURATION |
| $t_W$ | PERSISTING TIME OF THE WORKLOAD $W$ |
| $COST_{RESOURCE}(C)$ | COST OF RESOURCE CONSUMPTION PER TIME INTERVAL WITH THE CURRENT CONFIGURATION $C$ |
| $P(C, W, t)$ | PENALTY FUNCTION OF QoS VIOLATION WITH THE CONFIGURATION $C$ WHEN THE WORKLOAD IS CHANGING TO $W$ AND PERSISTING THROUGH $t$ TIME UNITS |

FIG. 6
600

| CONFIGURATION TYPE | # OF VMs | MEMORY (GB) | vCPUs | PRICE (PER TIME UNIT) |
| --- | --- | --- | --- | --- |
| SMALL | 1 | 1 | 1 | $0.01 |
| MEDIUM | 2 | 4 | 1 | $0.02 |
| LARGE | 4 | 8 | 2 | $0.05 |

RESOURCE SCALING IN COMPUTING INFRASTRUCTURE

FIELD

The field relates generally to computing environments, and more particularly to system resource scaling in such computing environments.

BACKGROUND

The term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

The elastic nature of a cloud computing environment (a cloud infrastructure) thus enables on-demand resource acquiring and releasing in response to incoming variant workloads. As a result, tenants (e.g., customer or end-user of cloud infrastructure/services) should only need to pay for virtual resources they actually need, with their quality-of-service (QoS) requirements satisfied in the meantime.

A set of scaling rules determines when scaling operations are triggered and how many resources are allocated or de-allocated, and the operator can determine whether the system should take automatic action for these operations or whether they will simply trigger notifications (e.g., separate sequence necessary to perform the recommended operation). The service provider has to first estimate the capacity requested by each specific workload so that the QoS requirements specified in the service level agreement (SLA) between the tenant and the service provider are not violated, and subsequently demand the exact resources needed.

SUMMARY

Embodiments of the invention provide techniques for resource scaling in a computing environment.

For example, in one embodiment, a method comprises the following steps. A current workload associated with a computing infrastructure is monitored for a change in the current workload. A first cost value is computed wherein the first cost value indicates a cost associated with scaling a current resource configuration for the computing infrastructure to respond to the change to the current workload. A second cost value is computed wherein the second cost value indicates a cost associated with ignoring the change to the current workload and maintaining the current resource configuration for the computing infrastructure. The first cost value and the second cost value are compared. A determination is made whether to scale or maintain the current resource configuration based on the comparison of the first cost value and the second cost value.

The first and second cost values may be computed based on a time for which the change to the workload persists. As such, a determination to scale the current resource configuration is made when the workload change persist time is greater than a given threshold time value, and a determination to maintain the current resource configuration and ignore the change is made when the workload change persist time is less than the given threshold time value, and the second cost value is less than the first cost value.

Advantageously, illustrative embodiments provide techniques for avoiding wasteful resource scaling when a change to the workload is sudden and transient, i.e., bursty in nature.

These and other features and advantages of the invention will become more readily apparent from the accompanying drawings and the following detailed description.

DETAILED DESCRIPTION

Illustrative embodiments may be described herein with reference to exemplary cloud infrastructure, data repositories, data centers, data processing systems, computing systems, data storage systems and associated servers, computers, storage units, storage arrays, and devices such as processing devices. It is to be appreciated, however, that embodiments of the invention are not restricted to use with the particular illustrative system and device configurations shown. Moreover, the phrases "cloud infrastructure," "cloud platform," "data repository," "data center," "data processing system," "data storage system," "computing system," "computing environment," and the like as used herein are intended to be broadly construed, so as to encompass, for example, private, public or hybrid (part private and part public) cloud computing or storage systems, as well as other types of systems comprising distributed virtual infrastructure. However, a given embodiment may more generally comprise any arrangement of one or more processing devices.

As used herein, the following terms and phrases have the following illustrative meanings: "application" refers to one or more software programs designed to perform one or more functions (e.g., in a data center context, applications are typically tenant defined software programs); "infrastructure" refers to physical and/or virtual resources that make up and/or support an overall IT environment including, but not limited to, computing, storage, and/or network components (including hardware and software implementations); and "scaling" refers to adding ("scaling up," acquiring, or increasing) and/or removing ("scaling down," releasing, or decreasing) allocated resources in a computing system (e.g., cloud infrastructure).

As will be explained, illustrative embodiments provide an intelligent on-demand resource scaling methodology to predict future characteristics of workloads by learning from past events, to recognize sudden, transient workload change via reinforcement learning, and to allocate resources according to the resource cost and provisioning overhead for the subsequent workload. A primary objective is to avoid useless scaling operations that do not improve QoS or the resource cost of operating the workload at the current QoS, and to maximize the benefits of resource scaling by intelligently identifying the next optimal configuration once a workload change occurs.

A resource scaling system according to illustrative embodiments provides for the configuration of virtual resources on demand based on real-time resource usage, workload change and performance status. The virtual resource can be defined with operational parameters that influence when the resource is activated and deactivated to meet the fluctuating demands.

Further, a resource scaling system according to illustrative embodiments delivers the correct resources to applications at the correct time, with improved availability and significant cost savings. Also, the system can be deployed within or on top of multiple types of resource pools, such as, by way of example only, bare metal and virtual data centers, private clouds and public clouds.

It is realized herein that the amount of resources required by a cloud application can be viewed as a function of two primary factors: the established SLA between end-users and the service provider, as well as the current workload generated by the application. Profits can be maximized by minimizing the costs of resources provisioned and the penalties due to violation of the previously established SLA constraints.

Whereas scaling up resources in response to the increase of workload is a feasible way to avoid penalties when the perceived application performance degrades below the agreed SLA, it is not always feasible, especially when dealing with sudden, transient workload changes. The increase of resources does not necessarily lower penalty costs. Besides, additional provisioning overhead and the delays introduced by the scaling process itself should not be ignored. Therefore, it is realized herein that it is important to correctly recognize the change pattern and appropriately respond to the specific workload, so as to achieve minimal costs and optimal performance as quickly as possible.

Two types of workload changes are featured in the cloud environment, i.e., relatively gentle changes and bursty changes, which are naturally different components in the aggregate workload. The gentle workload change refers to the relatively smooth change happening within a certain duration of time and gradually stabilized, such as expected workload growth over-time due to slow-increasing user requests, tenants, etc. The bursty change refers to the sudden, much larger but transient workload change experienced in the cloud platform, such as a sudden increase in the demand due to an unpredictable event in time, or a planned event but with unpredictable load volumes. Workload burstiness decreases online application's performance and leads to reduced QoS and service disruption. It is among the hurdles complicating autonomic virtual resource management.

Existing rule-based resource scaling systems, although performing well in many cases, have the disadvantage of requiring modifications, even for a minor change in the problem space. Furthermore, the existing rule-based approach cannot handle unanticipated situations.

Thus, a main idea behind providing a learning system according to illustrative embodiments is to guarantee robust actions without the complete knowledge, if any, of the situational environment. A main advantage of reinforcement learning according to illustrative embodiments, compared to other learning approaches, is that it requires no information about the environment except for a reinforcement signal (which is a signal that reflects the success or failure of the entire system after it has performed some sequence of actions).

In the existing rule-based resource scaling approach, the scaling rule set may involve probabilistic rules pre-specified or learned via machine learning methods, where the triggering probabilities of resource scaling change over time in accordance with the stability or instability of application workloads. For instance, consider a rule saying that "if the workload crossed over the threshold, add a VM to the current VM group." When the workload increases and persists in a stable state, the resource scaling automation can deal with it appropriately while satisfying QoS requirements. When a change, however, is not stable and immediately vanishes, the scaling is useless. That is, in the existing rule-based resource scaling approach, reacting quickly to such a transient workload change is most likely to result in the worthless "acquire-release" actions of cloud resources, with unwanted overhead instead.

Embodiments of the invention overcome the above and other drawbacks with existing systems, as will be illustratively explained now in the context of FIGS. 1-8.

The required resource configuration $C_i$ supporting the workload $W_i$ is specified in the capacity planning. By proposing QoS requirements in the SLA, the tenant imposes requirements on virtual resource capacities such that the SLA constraints must not be violated for each known workload $W_i$. The output is a resource configuration recommendation R.

An optimal resource configuration recommendation R is a function which associates each workload $W_i$ with its corresponding resource configuration $C_i$ such that: 1) when the workload is $W_i$ and the configuration is $C_i$, none of the SLA constraints are violated; and 2) $C_i$ contains the least resources to satisfy the former condition.

Figure 1:
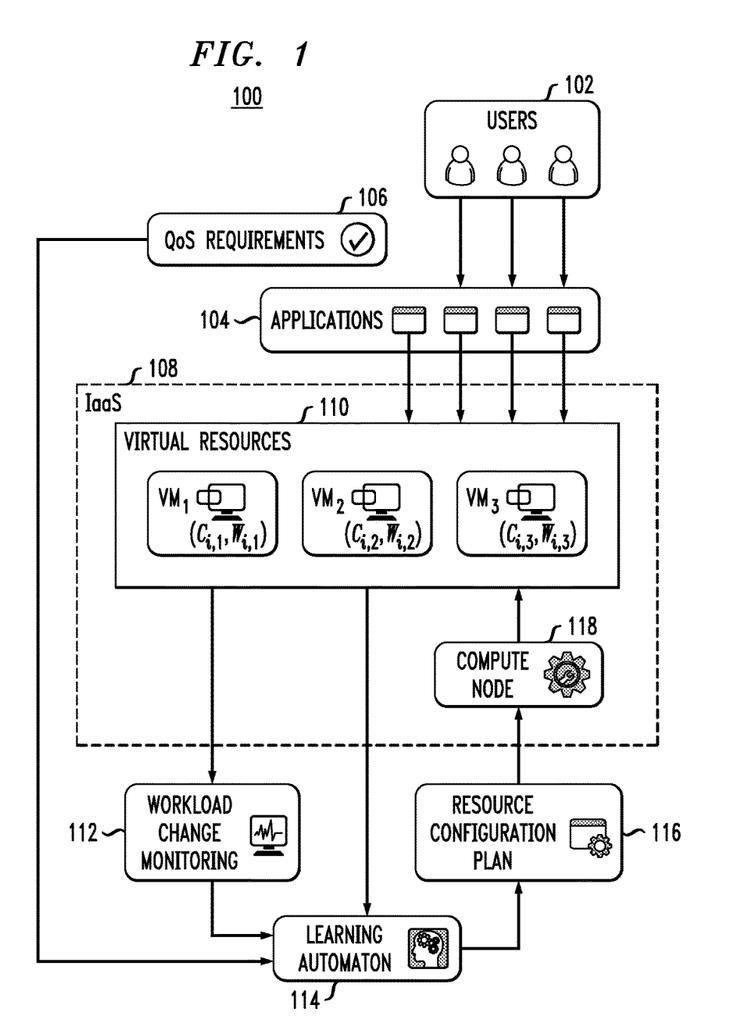
FIG. 1 illustrates a resource scaling system, according to an embodiment of the invention.

FIG. 1 illustrates a resource scaling system 100 according to an illustrative embodiment. As shown, one or more users 102 interact with one or more applications 104. These interactions have previously agreed upon QoS requirements 106 that the service provider of the cloud infrastructure hosting the applications 104 needs to satisfy. In system 100, the cloud infrastructure comprises an Infrastructure-as-a-Service (IaaS) layer 108 that instantiates multiple virtual machines 110 ($VM_1$, $VM_2$, $VM_3$ in this example; although more or less VMs may be instantiated by the IaaS platform).

As is known, IaaS is one of the service models of the cloud computing paradigm. As with all cloud computing services, IaaS provides access to computing resources in a virtualized environment (one or more clouds) via a public network such as the Internet. In the case of IaaS, the computing resource provided as part of the service is virtualized hardware, i.e., computing infrastructure. The features typically offered include, but are not limited to, virtual server space (instantiating VMs), network connections, bandwidth, Internet Protocol (IP) addresses, and load balancers. Physically, the hardware resources include, but are not limited to, servers and networks typically distributed across multiple data centers. Thus, the IaaS approach provides a plurality of clouds on-demand that form a plurality of data centers (e.g., software defined data centers or SDDCs).

System 100 also comprises a workload change monitor 112 which, as will be explained in further detail below, monitors workload $W_i$ change from one or more VMs (which have a $C_i$ associated therewith). Learning automation manager 114 receives input from monitor 112, QoS requirements 106, and input from VMs 110. Manager 114 provides results to resource configuration planner 116 which generates a specific resource allocation plan that compute node 118 implements (e.g., scale up by adding one or more VMs or scale down by removing one or more VMs).

More specifically, information used by the resource scaling system 100, including the virtual resource configuration 110, QoS requirements 106 specified and workload changes in real-time 112, is collected as the input of the learning automaton manager 114. The learning automaton manager 114 determines the next optimal resource configuration via adaptive learning. When the workload change is detected by monitor 112, learning automaton manager 114 evaluates the optimal configuration for the in-coming workload. If a scaling decision is made, the new resource configuration plan 116 is generated and sent out to the compute node 118 in the cloud environment.

Figure 2:
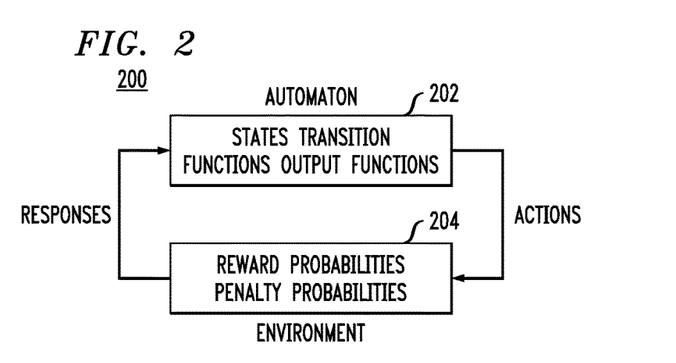
FIG. 2 illustrates learning automation for resource scaling, according to an embodiment of the invention.

As illustrated in system 200 of FIG. 2, the learning automaton manager 114 is an adaptive decision-making unit situated in the cloud infrastructure environment that automatically 202 learns optimal actions through repeated interactions with the environment 204. The actions are chosen according to a specific probability distribution (e.g., states, transition functions, output functions) which is updated based on the environment response (e.g., reward probabilities, penalty probabilities).

The paradigm of learning automaton may be presented as follows: a finite number of actions can be performed in a random environment. When a specific action is performed, the environment provides a random response which is either favorable or unfavorable. The objective in the design of the automaton is to determine how the choice of the action should be guided by past actions and responses. The environment responds to the action of the automaton by producing a response, belonging to a set of allowable responses, which is probabilistically related to the automaton action.

In one embodiment, learning automaton manager 114 comprises a finite state machine that aims to apply the best action on the environment through a learning process. The best action is the one that maximizes the probability of receiving rewards from the environment. The automaton chooses an action repeatedly based on the action probability and then updates the action probability considering the environment responses.

Figure 3:
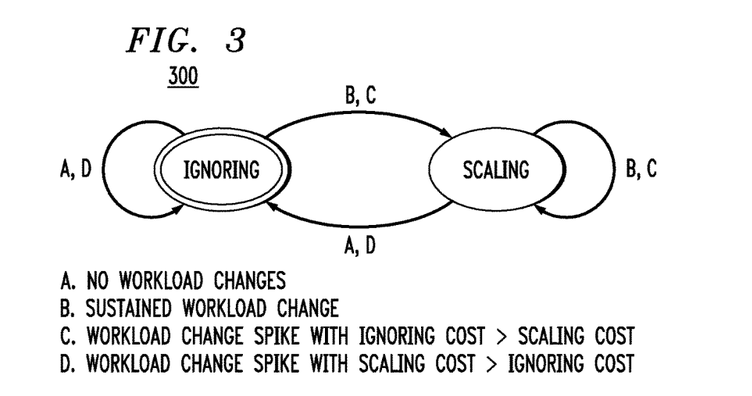
FIG. 3 illustrates a state machine for resource scaling, according to an embodiment of the invention.

A state machine 300 used in one embodiment for resource scaling is shown in FIG. 3. In the scaling system, to learn the type of each individual workload change, the automation corresponding to the change with respect to two actions {ignoring, scaling} is defined. Once a workload change is occurring, the costs of ignoring and scaling are calculated and compared. If the ignoring cost is greater, the probability of scaling action in the automaton is increased; otherwise the ignoring action is reinforced.

There are two operational states in the state machine 300, ignoring and scaling. The ignoring state is the initial state. At the ignoring state, no resource recommendations are generated, and the current virtual resource configuration remains unchanged. At the scaling state, the resource scaling recommendation is sent out to the compute node 118 in the IaaS platform 108, so as to trigger the resource scaling operations.

The real-time workload monitoring information (from monitor 112) is sent to the state machine. The state machine identifies the type of workload change via comparison with the previous workload information, and then chooses the next state.

The state machine chooses to transit to or stay at the ignoring state when: the workload remains unchanged (condition A); or there is a bursty workload change, with ignoring cost less than scaling cost (condition D).

The state machine chooses to transit to or stay at the scaling state when: a sustained workload change, recognized from the historical workload changing data, is occurring in the workload (condition B); or a bursty workload change occurs, with scaling cost less than the ignoring cost (condition C).

Figure 4:
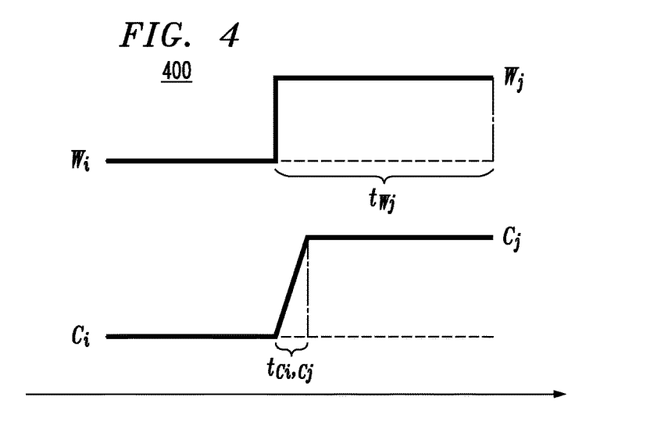
FIG. 4 illustrates workload change and cost scaling, according to an embodiment of the invention.

Assume that the input workload is $W_i$ and the current resource configuration is $C_i$, as shown in example 400 of FIG. 4. An increase to the new workload $W_j$ may be reacted to by the auto-scaling system (e.g., system 200 of FIG. 2) either by scaling out $C_i$ to the new configuration $C_j$, or ignoring the workload change with no scaling operations.

In the former case, assuming that the new workload persists through $t_{w_j}$ time units, the total scaling cost incurred is computed as follows:

$$\text{Cost}_{scaling}(C_i, C_j, W_j, t_{W_j}) = \int_0^{t_{C_i,C_j}} P(C_i, W_j, t)dt + \text{Cost}_{Resource}(C_j) \times (t_{W_j} - t_{C_i,C_j})$$

where $t_{C_i,C_j}$ is the scaling overhead time from the resource configuration $C_i$ to $C_j$; P(C, W, t) is the SLA violation penalty function where the workload W persists through t time units under the resource configuration C, and $$\int_0^{t_{C_i,C_j}} P(C_i, W_j, t)dt$$

refers to the violation penalty when the workload $W_j$ persists through $t_{C_i,C_j}$ under $C_i$; $\text{Cost}_{Resource}(C)$ is the resource cost under the configuration C per time unit, and $\text{Cost}_{Resource}(C_j) \times (t_{w_j} - t_{C_i,C_j})$ refers to the resource cost when $C_j$ goes on for the duration $(t_{w_j} - t_{C_i,C_j})$.]

If the workload change is ignored, the total ignoring cost value incurred is computed as follows:

$$\text{Cost}_{ignoring}(C_i, W_j, t_{W_j}) = \int_0^{t_{W_j}} P(C_i, W_j, t)dt + \text{Cost}_{Resource}(C_j) \times t_{W_j}$$

where $P(C_i, W_j, t)$ is the penalty value of SLA violation when the resource configuration is kept with $C_i$ but the new workload is $W_j$, and $\text{Cost}_{Resource}(C_i)$ is the resource cost with the current configuration $C_i$ per time unit.

Figure 5:
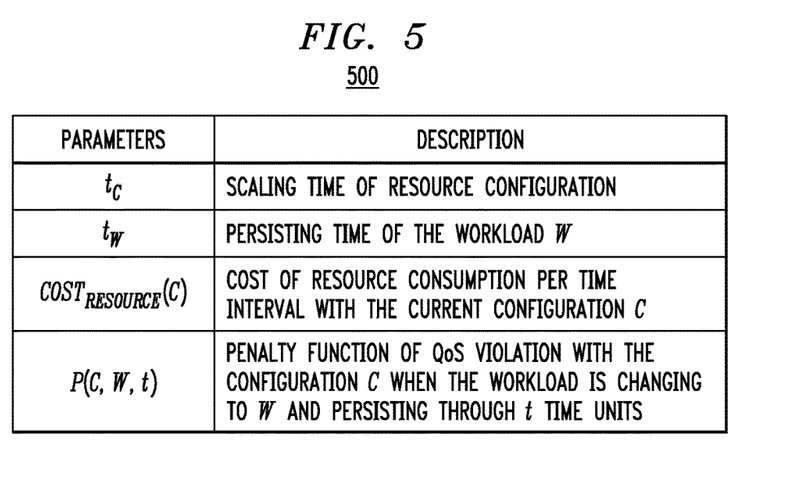
FIG. 5 illustrates cost model parameters, according to an embodiment of the invention.
Figure 6:
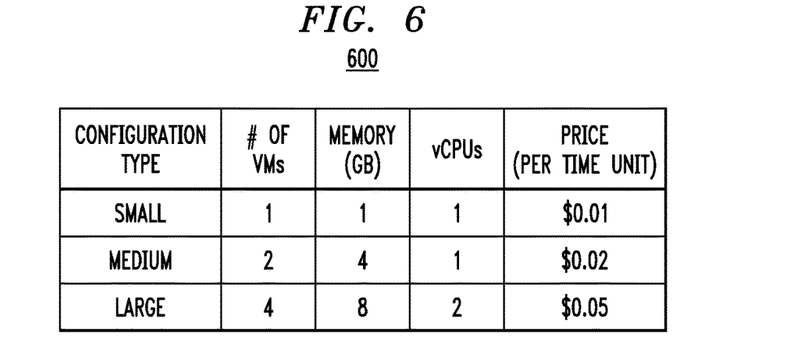
FIG. 6 illustrates resource configuration types, according to an embodiment of the invention.

The cost model parameters are listed in table 500 of FIG. 5. The time values of $t_c$ and $t_w$ are obtained by the monitoring agent (monitor 112), and the resource cost $\text{Cost}_{Resource}(C)$ is pre-defined by the cloud service provider. The penalty function P (C, W, t) may be specified according to the application type and the specific performance measure. For example, for a web service, the delay of HTTP (HyperText Transport Protocol) response time is used as the criterion when calculating the penalty.

Thus, there is a cost evaluation process corresponding to each workload change determined at runtime considering resource scaling costs and SLA violation penalty. Based on the evaluation result, the appropriate resource scaling recommendations are generated to feed into the compute node 118 in the IaaS platform 108.

If a given workload has not changed, no more actions are needed.

If a given workload has changed, and identified as the sustained change by learning automation, the corresponding resource scaling recommendations are generated.

If a given workload has changed, the changing pattern and durability is learned by the learning automation based on the historical information. When it is identified as a bursty change, the scaling cost and ignoring cost are calculated separately. If the scaling cost is less than the ignoring cost, this means that scaling with new resource configuration is more profitable for user applications than keeping the current configuration. If the ignoring cost is less than the scaling cost, no more actions are needed.

Assuming that the penalty function is an ascending function and the cloud resource cost per time unit for the configuration C is constant along the time, a particular time duration value $t_{thresh}$ where both cost functions are equal can be determined. Hence, if the new workload duration is less than $t_{thresh}$, the workload change is assumed to be bursty and the scaling system has to ignore it due to the fact that for any $t<t_{thresh}$, the ignoring cost is less value than the scaling cost. For any workload duration $t>t_{thresh}$, the scaling system scales out/in the current resource configuration to the new one.

In one embodiment, the scaling system identifies the workload burstiness using a reinforcement learning algorithm. The system is therefore able to avoid useless virtual resource scaling operations when the subsequent workload is transient and unstable. Preventing the resource configuration from being scaled when the subsequent workload is unstable leads to considerable reduction in the total costs incurred.

The cost evaluation model used in the learning automation comprehensively considers the resource costs from configuration and scaling operations, and the penalty due to the SLA violation. It is more helpful and effective when utilized to identify the workload changes in a real cloud environment.

We conducted an experiment of the above-described intelligent resource scaling system design in a web application scenario, i.e., a file downloading service. The service is provided by one web balancer instance and multiple instances of file servers. The experiment was designed to illustrate the effectiveness of the method in reducing the overall costs by ignoring the workload change spikes and thus avoiding overheads due to useless resource reconfiguration.

In the experiment, we used the OpenStack as a reference cloud infrastructure setup. The examples of the virtual resource configuration types (i.e., small, medium, large) with associated costs are listed table 600 of FIG. 6. It is to be appreciated that the resource configuration types are intended to be for illustrative purposes only, and embodiments are not limited to those configurations shown in table 600.

A rain-workload-toolkit is used to generate workloads consisting of different types of change to evaluate the proposed method. It is a statistics-based workload generation toolkit that uses parameterized and empirical distributions to model the different classes of workload variations. We used the toolkit to generate different types of composite workloads, such as a workload with durable and steady increases, a workload with sudden and transient increases, and a mixed workload.

The service provider has the responsibility to provide users with a fast and stable service. At the same time, the provider also hopes to avoid waste of resources. That is to say, in automated cloud resource management, we need to implement the functionality of dynamic resource adjustment in accordance with changing workload.

In the experimental evaluation compared with the pre-defined rule-based scaling method, in which the resource reconfiguration is performed once the workload change crosses over the pre-specified workload threshold regardless of its durability and scaling cost, the intelligent method according to embodiments of the invention demonstrates better performance in overall cost savings, especially when dealing with the sudden, transient changes in composite workloads.

Figure 7:
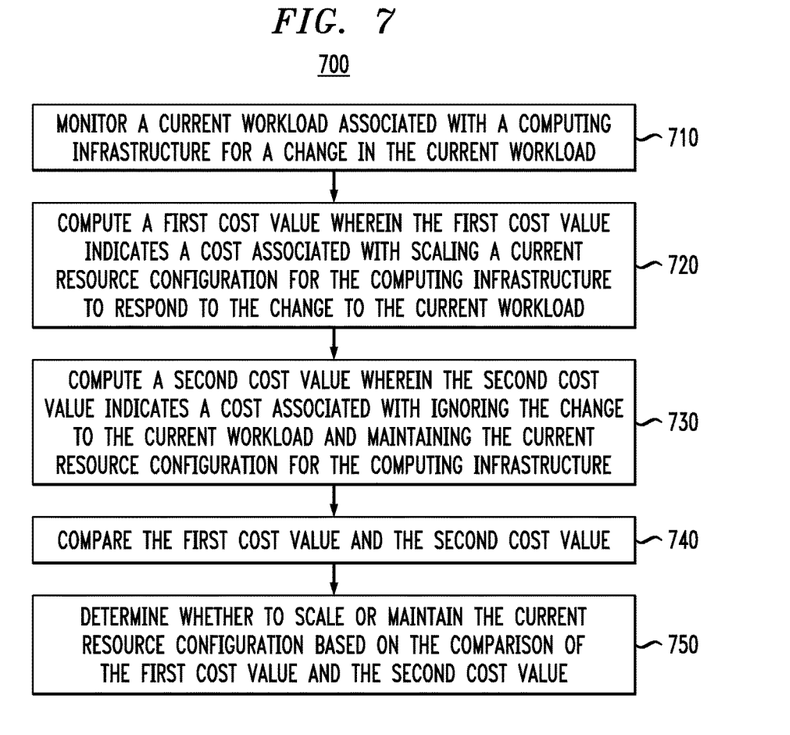
FIG. 7 illustrates a methodology for resource scaling, according to an embodiment of the invention.

FIG. 7 illustrates a methodology 700 for resource scaling, according to an embodiment of the invention. Step 710 monitors a current workload associated with a computing infrastructure for a change in the current workload. Step 720 computes a first cost value wherein the first cost value indicates a cost associated with scaling a current resource configuration for the computing infrastructure to respond to the change to the current workload. Step 730 computes a second cost value wherein the second cost value indicates a cost associated with ignoring the change to the current workload and maintaining the current resource configuration for the computing infrastructure. Step 740 compares the first cost value and the second cost value. Step 750 determines whether to scale or maintain the current resource configuration based on the comparison of the first cost value and the second cost value.

Figure 8:
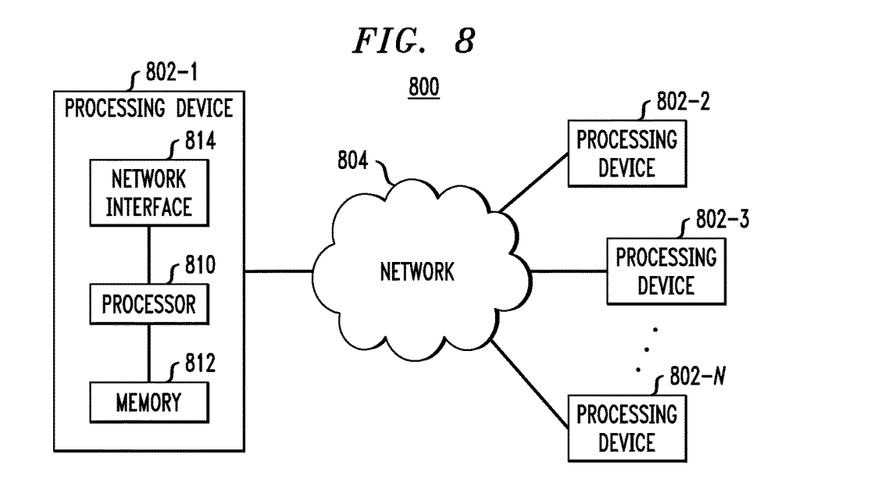
FIG. 8 illustrates a processing platform used to implement a resource scaling system, according to an embodiment of the invention.

As an example of a processing platform on which a resource scaling system (e.g., 100 of FIG. 1) can be implemented is processing platform 800 shown in FIG. 8. The processing platform 800 in this embodiment comprises a plurality of processing devices, denoted 802-1, 802-2, 802-3, . . . 802-N, which communicate with one another over a network 804. It is to be appreciated that the methodologies described herein may be executed in one such processing device 802, or executed in a distributed manner across two or more such processing devices 802. It is to be further appreciated that a server, a client device, a computing device or any other processing platform element may be viewed as an example of what is more generally referred to herein as a "processing device." As illustrated in FIG. 8, such a device generally comprises at least one processor and an associated memory, and implements one or more functional modules for instantiating and/or controlling features of systems and methodologies described herein. Multiple elements or modules may be implemented by a single processing device in a given embodiment.

The processing device 802-1 in the processing platform 800 comprises a processor 810 coupled to a memory 812. The processor 810 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 810. Memory 812 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 812 may comprise electronic memory such as random access memory (RAM), read-only memory (ROM) or other types of memory, in any combination. The one or more software programs when executed by a processing device such as the processing device 802-1 causes the device to perform functions associated with one or more of the components/steps of system/methodologies in FIGS. 1-7. One skilled in the art would be readily able to implement such software given the teachings provided herein. Other examples of processor-readable storage media embodying embodiments of the invention may include, for example, optical or magnetic disks.

Processing device 802-1 also includes network interface circuitry 814, which is used to interface the device with the network 804 and other system components. Such circuitry may comprise conventional transceivers of a type well known in the art.

The other processing devices 802 (802-2, 802-3, . . . 802-N) of the processing platform 800 are assumed to be configured in a manner similar to that shown for computing device 802-1 in the figure.

The processing platform 800 shown in FIG. 8 may comprise additional known components such as batch processing systems, parallel processing systems, physical machines, virtual machines, virtual switches, storage volumes, etc. Again, the particular processing platform shown in this figure is presented by way of example only, and the resource scaling system may include additional or alternative processing platforms, as well as numerous distinct processing platforms in any combination.

Also, numerous other arrangements of servers, clients, computers, storage devices or other components are possible in processing platform 800. Such components can communicate with other elements of the processing platform 800 over any type of network, such as a wide area network (WAN), a local area network (LAN), a satellite network, a telephone or cable network, or various portions or combinations of these and other types of networks.

Furthermore, it is to be appreciated that the processing platform 800 of FIG. 8 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 800 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 800 in one or more embodiments of the invention is the VMware vSphere (commercially available from VMware Inc., Palo Alto, Calif.) which may have an associated virtual infrastructure management system such as the VMware vCenter. The underlying physical infrastructure may comprise one or more distributed processing platforms that include storage products such as, but not limited to, Isilon, VNX and VPLEX (commercially available from EMC Corporation, Hopkinton, Mass.). A variety of other computing and storage products may be utilized to implement the one or more services that provide the functionality and features described herein.

It was noted above that portions of the system environment 100 may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
monitoring a current workload associated with a computing infrastructure for a change in the current workload;
in response to determining that the change in the current workload associated with the computing infrastructure is greater than or equal to a given threshold time value, computing:
a first cost value, wherein the first cost value indicates a cost associated with scaling a current resource configuration for the computing infrastructure to a new resource configuration for the computing infrastructure to respond to the change to the current workload, wherein the first cost value is further computed based on a first penalty cost associated with a penalty cost of scaling the current resource configuration to the new resource configuration and a first resource duration cost associated with a cost of scaling the current resource configuration to the new resource configuration during a first time duration, and wherein the first time duration is computed based on the duration of the change in the current workload; and
a second cost value, wherein the second cost value indicates a cost associated with ignoring the change to the current workload and maintaining the current resource configuration for the computing infrastructure;

comparing the first cost value to the second cost value; and scaling the current resource configuration when the first cost value is less than the second cost value, wherein scaling the current resource configuration comprises adding one or more additional resources to the current resource configuration for the computing infrastructure when the change in the current workload is an increase in the current workload, and wherein scaling the current resource configuration comprises removing one or more current resources from the current resource configuration for the computing infrastructure when the change in the current workload is a decrease in the current workload;

wherein the steps of the method are performed by at least one processing device comprising a processor operatively coupled to a memory.

2. The method of claim 1, further comprising ignoring the change in the current workload and maintaining the current resource configuration in response to determining that the change in the current workload is less than the given threshold time value.

3. The method of claim 1, wherein the second cost value is further computed based on a second penalty cost associated with a penalty cost of maintaining the current resource configuration despite the change to the workload, and a second resource duration cost associated with a cost of maintaining the current resource configuration during a second time duration, and wherein the second time duration is computed based on the duration of the change in the current workload.

4. The method of claim 1, wherein the computing, comparing and determining steps are performed via an adaptive learning process.

5. The method of claim 4, wherein the adaptive learning process is implemented via a state machine.

6. The method of claim 1, wherein the computing infrastructure comprises a cloud infrastructure.

7. The method of claim 6, wherein the resource configuration comprises a set of instantiated virtual machines.

8. The method of claim 1, wherein the first penalty cost comprises a penalty cost associated with the change in the current workload persisting during an overhead time associated with scaling the current resource configuration to the new resource configuration to respond to the change.

9. The method of claim 1, wherein the first resource duration cost is computed at least as a cost of the new resource configuration per unit of time multiplied by the first time duration, and wherein the first time duration is computed as a difference of the workload change time and an overhead time associated with scaling the current resource configuration to the new resource configuration to respond to the change.

10. The method of claim 1, wherein the second resource duration cost is computed at least as a cost of the current resource configuration per unit of time multiplied by the second time duration, and wherein the second time duration is the duration of the change in the current workload.

11. The method of claim 1, further comprising maintaining the current resource configuration in response to determining that the second cost value is less than the first cost value.

12. An article of manufacture comprising a non-transitory processor readable storage medium having encoded there executable code of one or more software programs, wherein the one or more software programs when executed by one or more processing devices implement steps:

monitoring a current workload associated with a computing infrastructure for a change in the current workload;

in response to determining that the change in the current workload associated with the computing infrastructure is greater than or equal to a given threshold time value, computing:

a first cost value, wherein the first cost value indicates a cost associated with scaling a current resource configuration for the computing infrastructure to a new resource configuration for the computing infrastructure to respond to the change to the current workload, wherein the first cost value is further computed based on a first penalty cost associated with a penalty cost of scaling the current resource configuration to the new resource configuration and a first resource duration cost associated with a cost of scaling the current resource configuration to the new resource configuration during a first time duration, and wherein the first time duration is computed based on the duration of the change in the current workload; and a second cost value, wherein the second cost value indicates a cost associated with ignoring the change to the current workload and maintaining the current resource configuration for the computing infrastructure;

comparing the first cost value to the second cost value; and scaling the current resource configuration when the first cost value is less than the second cost value, wherein scaling the current resource configuration comprises adding one or more additional resources to the current resource configuration for the computing infrastructure when the change in the current workload is an increase in the current workload, and wherein scaling the current resource configuration comprises removing one or more current resources from the current resource configuration for the computing infrastructure when the change in the current workload is a decrease in the current workload.

13. The article of manufacture of claim 12, further comprising maintaining the current resource configuration in response to determining that the second cost value is less than the first cost value.

14. An apparatus comprising:

a memory; and a processor operatively coupled to the memory and configured to:

monitor a current workload associated with a computing infrastructure for a change in the current workload;

in response to determining that the change in the current workload associated with the computing infrastructure is greater than or equal to a given threshold time value, compute:

a first cost value, wherein the first cost value indicates a cost associated with scaling a current resource configuration for the computing infrastructure to a new resource configuration for the computing infrastructure to respond to the change to the current workload, wherein the first cost value is further computed based on a first penalty cost associated with a penalty cost of scaling the current resource configuration to the new resource configuration and a first resource duration cost associated with a cost of scaling the current resource configuration to the new resource configuration during a first time duration and wherein the first time duration is computed based on the duration of the change in the current workload; and a second cost value, wherein the second cost value indicates a cost associated with ignoring the change to the current workload and maintaining the current resource configuration for the computing infrastructure;

compare the first cost value to the second cost value; and scale the current resource configuration when the first cost value is less than the second cost value, wherein scaling the current resource configuration comprises adding one or more additional resources to the current resource configuration for the computing infrastructure when the change in the current workload is an increase in the current workload, and wherein scaling the current resource configuration comprises removing one or more current resources from the current resource configuration for the computing infrastructure when the change in the current workload is a decrease in the current workload.

15. The apparatus of claim 14, wherein the apparatus is further configured to ignore the change in the current workload and maintain the current resource configuration in response to a determination that the change in the current workload is less than the given threshold time value, and the second cost value is less than the first cost value.

16. The apparatus of claim 14, wherein the processor is configured to perform the computing, comparing and determining via an adaptive learning process.

17. The apparatus of claim 14, wherein:
the second cost value is further computed based on a second penalty cost associated with a penalty cost of maintaining the current resource configuration despite the change to the workload, and a second resource duration cost associated with a cost of maintaining the current resource configuration during a second time duration, and wherein the second time duration is computed based on the duration of the change in the current workload.

18. The apparatus of claim 17, wherein:
the first penalty cost comprises a penalty cost associated with the change in the current workload persisting during an overhead time associated with scaling the current resource configuration to the new resource configuration to respond to the change; and
the first resource duration cost is computed at least as a cost of the new resource configuration per unit of time multiplied by the first time duration, and the first time duration is computed as a difference of the duration of the change in the current workload and the overhead time.

19. The apparatus of claim 17, wherein:
the second penalty cost comprises a penalty cost associated with maintaining the current resource configuration during the duration of the change in the current workload; and
the second resource duration cost is computed at least as a cost of the current resource configuration per unit of time multiplied by the second time duration, and the second time duration is the duration of the change in the current workload.

* * * * *